Patented Aug. 20, 1935

2,011,765

UNITED STATES PATENT OFFICE 2,011,765

INSECTICIDE AND FUNGICIDE AND METHOD OF MAKING THE SAME

Marcus T. Inman, West Nyack, N. Y., assignor to Clarence P. Byrnes, Sewickley, Pa., trustee No Drawing. Application December 5, 1929, Serial No. 411,989

7 Claims. (Cl. 167—22)

My invention relates to insecticides and fungicides and is designed to provide a more effective toxic compound than heretofore provided without burning or injury of the foliage of plants, shrubs or trees treated therewith.

The main feature of my invention lies in combining nicotine or nicotine compound such as nicotine sulphate, or its equivalent, with "Penetrol", the latter being a sulphonated and treated liquid derived from partial oxidation of hydrocarbons such as mineral oil fractions.

In obtaining such new compound, the procedure is preferably as follows: a fraction of mineral oil or petroleum such, for example, as gas oil, is vaporized, mixed with a measured amount of air and passed through hot reaction zone in contact with a catalyst such as molybdenum or vanadium oxides. The condensate from the exit stream of such partial oxidation apparatus contains a mixture of alcohols, aldehydes, ketones and oxygenated organic acids, saturated and unsaturated, both simple and complex, together with some unchanged aliphatic hydrocarbons. The proportions of these constituents may be varied and controlled by control of the factors in the partial oxidation process such as reaction temperature, amount of air, time of contact with catalyst, etc.

The condensed product is then sulphonated, preferably by adding sulphuric acid slowly to the oxidation liquid mixture, the mixture being preferably cooled by a water jacket.

The sulphonated product is then decomposed with water to remove excess of sulphuric acid and hydrolize a large percentage of the sulphonates and most, if not all, of the sulphates. After settling the diluted acid is drawn off and the product neutralized with sodium hydroxide and allowed to settle to remove the salt solution.

The sulphuric acid treatment may be in one step or in two successive sulphuric acid treatments, in either case hydrolizing and neutralizing with alkali being employed.

The resulting sulphonated oxidation product is usually a clear maroon colored liquid which is easily miscible with water to form an opalescent emulsion.

Such emulsion has unusual and remarkable spreading and wetting qualities, both as regards foliage and insects.

The penetrol thus formed has excellent toxic qualities and is, in itself, a valuable insecticide and fungicide. I have also found that when another toxic material or poison such as nicotine, or a nicotine compound such as nicotine sulphate, is added to this penetrol mixture, remarkable and unexpected toxic qualities are developed. The toxic qualities of such a mixture are much greater than either material used alone or either material used with other ordinary spray materials, even though the latter are used in much greater concentration.

I believe this new and unexpected result is caused by a new chemical compound formed by chemical combination of the nicotine or nicotine compound with the sulphonated oxidized aliphatic hydrocarbon products. The chemical compound thus formed is unknown and its chemical structure has not yet been ascertained; but the results show such a new compound is present as proven, for example, by the following test made by a public experiment station in the United States.

Penetrol 1–200+black leaf 50 (nicotine 1–2500 gave 100% kill on certain insects, while under the same conditions black leaf 50 (nicotine) 1–1250 added to fish oil soap 1–400 gave only 18% kill. Under the same conditions fish oil soap 1–400 with black leaf 50 (nicotine) 1–2500 gave only 25% kill.

This example, among many others, shows a new and definite high toxicity which I consider to be the result of a new chemical compound formed by reaction between the nicotine and the sulphonated oxidized petroleum product. Another fact indicating the formation of such a new compound is that a spray of nicotine in water is irritating to the eyes and skin of an operator; but when the penetrol compound is added to the spray solution, it is rendered non-irritating to the eyes and skin of the workman.

Furthermore, when the mixture of penetrol and nicotine is dried it is far more stable and persistent than either nicotine or nicotine mixed with ordinary unoxidized petroleum oils. This is a definite indication of the formation of a new and distinct nicotine compound.

In fact, the dried dust or powder from the mixture of suphonated oxidized petroleum product (penetrol with nicotine) may itself be used as an excellent insecticide and fungicide when applied in the dust or powder form.

The advantages of my invention will be obvious to those skilled in the art since remarkable killing power of inserts, fungus, scale, etc. is obtained when a poison or toxic material such as nicotine or nicotine compound is added to the sulphonated oxidized aliphatic hydrocarbon product which is now sold under the name of "Penetrol". Moreover, the sulphonated oxidized product gives remarkable spreading and wetting properties, and does not burn or materially injure the foilage to which it is applied. Furthermore, the material emulsifies readily with water and hence may be emulsified in the field by mere addition of water before using. It may also be used in dust or powder form.

Other equivalent poisons may be used instead of nicotine, or nicotine compound, the method of sulphonating or sulphating may be varied, the method of partial oxidation may be changed, and other changes may be made without departing from my invention.

By the word "nicotine" in my claims I intend to cover nicotine or its equivalents, such as pyrethrum or other poison or toxic material, or any compound of nicotine or such other poison such, for example, as nicotine sulphate.

I do not claim herein, either in process or product form, the use of sulphonated partially oxidized aliphatic hydrocarbons in an insecticide or fungicide, nor toxic material combined therewith; as these broader inventions are disclosed and claimed in the copending application of Joseph Hidy James, Ser. No. 310,427, filed October 4, 1928.

I claim:

1. As a new article of manufacture, an insecticide or fungicide composition containing a compound resulting from a reaction between partially oxidized and sulphonated aliphatic hydrocarbons and a nicotine.

2. In the manufacture of insecticide and fungicide compounds, the steps consisting of sulphonating a partial oxidation product of aliphatic hydrocarbons containing an artificially-introduced chemically-combined oxygen, adding nicotine thereto, and causings a reaction to occur between the oxidized material and the added nicotine.

3. As a new article of manufacture, an insecticide and fungicide composition containing sulphonated and hydrolized oxygen derivatives of aliphatic hydrocarbons having excess acid neutralized, and a chemical compound resulting from a reaction between said product and a nicotine.

4. As a new article of manufacture, an insecticide or fungicide composition containing a sulphonated liquid mixture of oxygen derivatives of aliphatic hydrocarbons and an organic toxic material having insecticidal or fungicidal properties capable of admixture therewith, the hydrocarbon compounds being sufficient in quantity to spread the mixture in use.

5. As a new article of manufacture, an insecticide or fungicide composition containing a sulphonated liquid mixture of oxygen derivatives of aliphatic hydrocarbons and a sulphonated partial oxidation product of aliphatic hydrocarbons in the range from alcohols to organic acids and an organic toxic material having insecticidal or fungicidal properties which is capable of having its killing efficiency and spreading characteristics increased by the admixture.

6. As a new article of manufacture, an insecticide or fungicide composition containing sulphonated oxygen derivatives of aliphatic hydrocarbons and a small percentage of an organic toxic material which is capable of having its killing efficiency and spreading power increased by the said sulphonated product.

7. As a new article of manufacture, an insecticide or fungicide composition containing sulphonated and hydrolyzed oxygen derivatives of aliphatic hydrocarbons and a small percentage of an organic toxic material which is capable of having its killing efficiency and spreading power increased by the said sulphonated product.

MARCUS T. INMAN.